United States Patent [19]

Nayland

[11] 4,163,995
[45] Aug. 7, 1979

[54] APPARATUS AND METHOD FOR DETECTING NON-ALIGNMENT OF A MAGNETIC HEAD WITH RESPECT TO A RECORDING TRACK ON A RECORD MEDIUM

[75] Inventor: William R. Nayland, Ripley, England

[73] Assignee: Burroughs Corporation, Detroit, Mich.

[21] Appl. No.: 946,297

[22] Filed: Sep. 27, 1978

Related U.S. Application Data

[63] Continuation of Ser. No. 792,294, Apr. 29, 1977, abandoned.

[51] Int. Cl.² ............................................ G11B 5/20
[52] U.S. Cl. ..................................... 360/76; 360/123
[58] Field of Search ................................. 360/75-77, 360/27, 137, 71, 123

[56] References Cited

U.S. PATENT DOCUMENTS

| 3,479,664 | 11/1969 | Stuart-Williams et al. | 360/77 |
| 3,491,352 | 1/1970 | Bernard | 360/123 |
| 3,742,470 | 6/1973 | Ha et al. | 360/77 |
| 3,852,815 | 12/1974 | Ljudmirsky et al. | 360/77 |
| 4,019,206 | 4/1977 | Haas | 360/123 |

FOREIGN PATENT DOCUMENTS 2402202  8/1974  Fed. Rep. of Germany ............. 360/77

Primary Examiner—John H. Wolff
Attorney, Agent, or Firm—Gerald J. Woloson; Edward J. Feeney, Jr.; Kevin R. Peterson

[57] ABSTRACT

A test pattern is recorded on the record medium by applying a pulse of direct current to a pattern generating meander line which is stationary with respect to the record medium. The record medium is then moved relative to the magnetic head to generate an electrical signal indicative of any lateral or angular deviation of the head with respect to the record medium.

1 Claim, 6 Drawing Figures

APPARATUS AND METHOD FOR DETECTING NON-ALIGNMENT OF A MAGNETIC HEAD WITH RESPECT TO A RECORDING TRACK ON A RECORD MEDIUM

This is a continuation of application Ser. No. 792,294, filed Apr. 29, 1977, now abandoned.

The present invention relates to apparatus and method for detecting non-alignment of a magnetic head with respect to a recording track on a record medium.

In recording or reproducing information with respect to a record medium, it is extremely important that the magnetic head be exactly aligned with the recording track; that is to say, the magnetic gap in the head should be exactly perpendicular to the centre line of the recording track (zero skew), and the centre of the magnetic gap should be exactly aligned with the centre line of the recording track (zero lateral deviation). A number of systems have been proposed to detect alignment of the magnetic head, many of these techniques involving the recording of a test pattern on the recording track by moving the record medium under one or more recording heads while passing a well defined sequence of currents through the head or heads. However, the known methods are not entirely satisfactory as they are time-consuming, expensive, and result in an accumulation of mechanical and electrical tolerances with consequent test pattern inaccuracies.

According to one aspect of the invention, there is provided apparatus for detecting non-alignment of a magnetic head, having a magnetic gap, with the centre line of a recording track on a magnetic record medium, comprising: a test pattern generating member including an electrically non-conductive support and a conductive pathway of a sinuous configuration extending longitudinally of the member; means for juxtapositioning the record medium in close proximity to said test pattern generating member; means for applying a pulse of direct current across said conductive pathway to record on the record medium a test pattern corresponding to the sinuous configuration of the electrically conductive pathway, with the centre line of the pathway defining the centre line of the recording track; and means for effecting relative movement between the recording and the magnetic head in the direction parallel to said centre line of the recording track to generate an electrical signal indicative of any deviation of the magnetic gap from being exactly perpendicular to the centre line of the recording track, or any deviation of the centre of the magnetic gap from being exactly aligned with the centre line of the recording track.

In the preferred embodiment of the invention described below, the electrically-conductive pathway is defined by an electrically-conductive strip having at least one pair of parallel non-conductive gaps longitudinally spaced from each other, one gap of the pair starting from one edge of the strip and extending transversely of the strip across its centre line and terminating short of its opposite edge, a predetermined distance from said centre line, the other gap of the pair starting from said opposite edge of the strip and extending transversely of the strip across its centre line and terminating short of said one edge by the same predetermined distance from said centre line.

In the described preferred embodiment, the electrically-conductive strip has a plurality of pairs of said parallel non-conductive gaps equally spaced from each other longitudinally of the strip. Also, each of said non-conductive gaps includes an end line section on each side of and at a right angle to the strip centre line, and an intermediate line section joining the two end line sections together and crossing the strip centre line at an acute angle thereto.

According to another aspect of the invention, there is provided a method of detecting non-alignment of a magnetic head, having a magnetic gap, with the centre line of a recording track on a magnetic record medium, comprising: juxtapositioning a magnetic record medium in close proximity to a test pattern generating member including an electrically non-conductive support and a conductive pathway of sinuous configuration extending longitudinally of the member; applying a pulse of direct current across said conductive pathway to record on the record medium a test pattern corresponding to the sinuous configuration of the conductive pathway, with the centre line of the pathway defining the centre line of the recording track; and effecting relative movement between the record medium and the magnetic head in the direction parallel to said centre line of the recording track to generate an electrical signal indicative of any deviation of the magnetic gap from being exactly perpendicular to the centre line of the recording track, or any deviation of the centre of the magnetic gap from being exactly aligned with the centre line of the recording track.

It will thus be seen that the apparatus and method of the present invention do not rely on relative motion between the magnetic head and the record medium when recording the test pattern on the latter, nor is a well defined current sequence required when recording the test pattern. Accordingly, the build up of inaccuracies is minimized.

In the preferred embodiment of the invention described below, the generated electrical signal indicative of the deviation of the magnetic head is displayed by a display unit, such as an oscilloscope, so that any necessary adjustment can be made in skew and lateral deviation while the generated electrical signal is viewed.

Further features and advantages of the invention will be apparent from the description below.

The invention is herein described, by way of example only, with reference to the accompanying drawings, wherein.

Figure 4A:
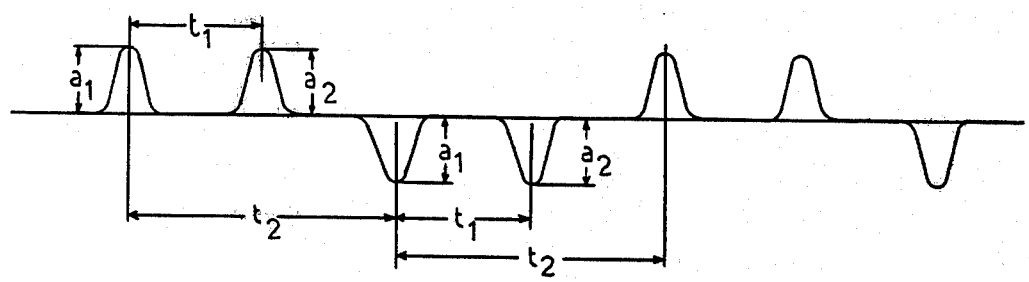
Figure 4B:
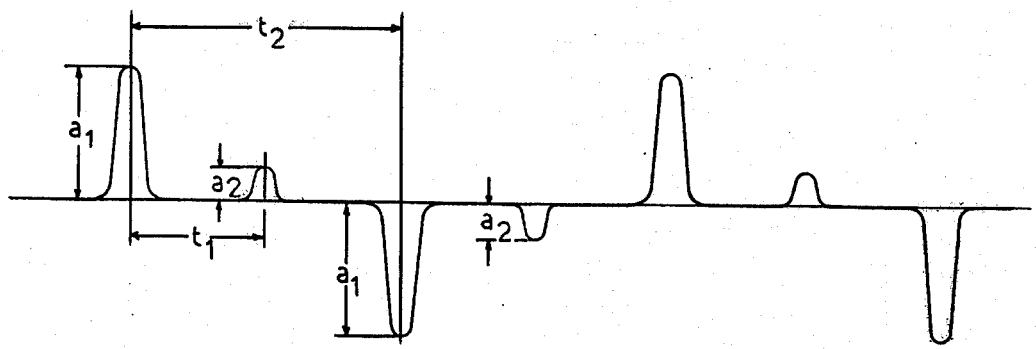
Figure 4C:
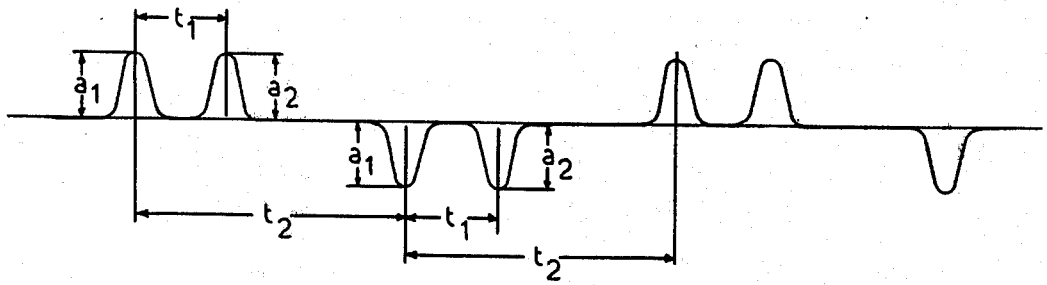

FIG. 4a illustrates the electrical signal generated by the magnetic head with respect to the recorded reference signal when the magnetic head is exactly aligned; and FIGS. 4b and 4c illustrate the electrical signals when the magnetic head is not exactly aligned, FIG. 4b illustrating the electrical signal when there is non-zero lateral deviation of the head, and FIG. 4c illustrating the electrical signal when there is non-zero skew.

Figure 1:
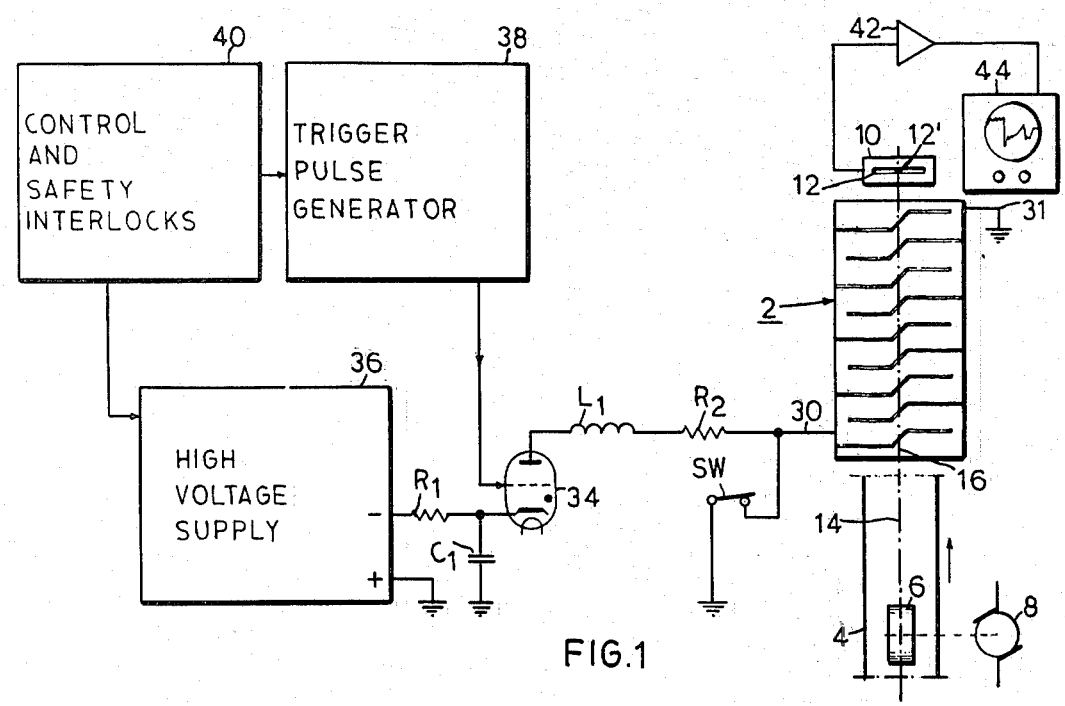
FIG. 1 illustrates one form of apparatus constructed in accordance with the invention for detecting the alignment of a magnetic head with respect to a recording track of a record medium.

The system illustrated in FIG. 1 includes a test pattern generating member in the form of a meander 2 adapted to generate a test pattern to be recorded on the record medium 4 when the latter is juxtapositioned in close proximity to the meander. For purposes of example, the record medium 4 is illustrated in FIG. 1 as being a magnetic tape, but it could be in other forms, such as a cash card having a magnetic track for recording information thereon.

FIG. 1 further illustrates the magnetic tape 4 being movable with respect to the test pattern generating meander 2 by means of a feed roller 6 driven by a motor 8. The magnetic head for recording and/or reproducing information with respect to magnetic tape 4 is schematically illustrated at 10 and includes a gap 12 whose alignment is to be detected with respect to the centre line 14 of the recording track on the magnetic tape 4. The recording track centre line 14 is aligned with the centre line 16 of the test pattern generating meander 2. That is to say, the magnetic gap 12, which is in the form of a slit, should be exactly perpendicular to the centre line 14 of the recording track on the magnetic tape 4 (zero-skew); and the centre 12' of the magnetic gap 12 should be exactly aligned with the magnetic tape centre line 14 (zero lateral deviation).

Figure 2:
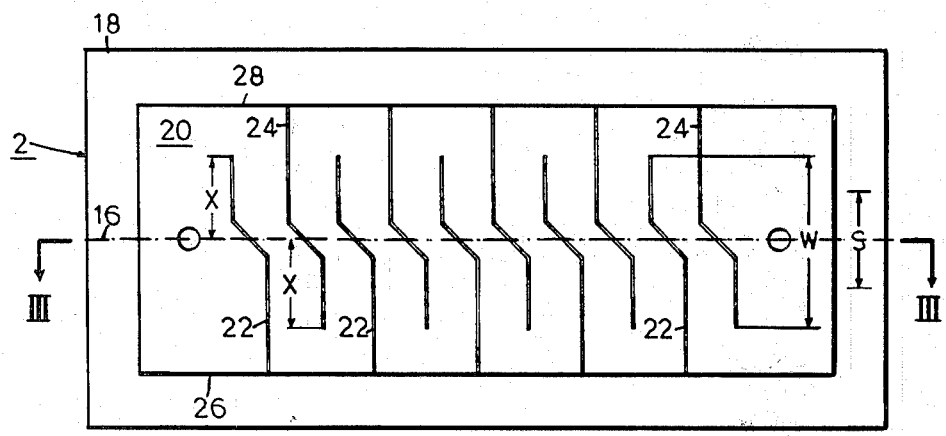
FIGS. 2 and 3 are plan and sectional views, respectively, of the test pattern generating member in the apparatus of FIG. 1.
Figure 3:
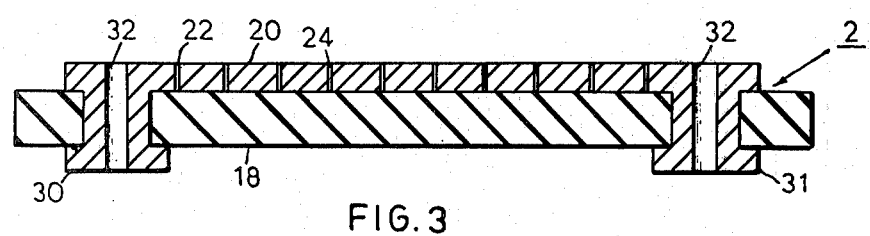

The test pattern generating member 2 is more particularly illustrated in FIGS. 2 and 3. It includes a non-conductive support or substrate 18 carrying on one face an electrically-conductive strip 20 defining a conductive pathway, having a sinuous or meandering configuration extending longitudinally of the member. The sinuous or meandering pathway is formed by providing the electrically conductive strip 20 with a plurality of pairs of parallel non-conductive gaps 22, 24 longitudinally spaced from each other. Cap 22 of each pair starts from one edge 26 of the strip and extends transversely of the strip across its centre line 16 and terminates short of its opposite edge 28 a predetermined distance ("X") from centre line 16. Gap 24 of each pair starts from the opposite edge 28 of the strip and extends transversely across its centre line 16, terminating short of edge 26 the same predetermined distance ("X") from centre line 16. More particularly, each of the gaps 22, 24 includes an end line section 22a, 22b and 24a, 24b, respectively on each side of and at a right angle to the strip centre line 16, and an intermediate line section 22c, 24c, joining the two end line sections together and crossing the strip centre line 16 at an acute angle, preferably about 45°. A substantially sinusoidal electrically conductive pathway is thus defined in the strip.

The opposite face of the non-conductive support 18 is formed with terminals 30 and 31 (FIG. 3) joined by plated-through holes 32 in the ends of the conductive pathway defined by conductive strip 20.

In use, the magnetic tape 4, or other record medium with which the invention is used, is juxtapositioned in close proximity to the sinuous or meandering conductive pathway 20 of the test pattern generating member 2, preferably by positioning tape 4 over member 2 and in contact with the conductive pathway. A pulse of unidirectional current is then applied across terminals 30, 31 of the conductive pathway 20 of member 2. As a result, a magnetization test pattern corresponding to the sinuous or meandering configuration of electrically conductive pathway 20 is produced and recorded on the overlying magnetic tape 4. The recorded magnetization pattern has linear pole strips aligned with the gaps 22, 24 of the conductive pathway 20; and the centre line of the recorded pattern is coincident with the centre line 16 of the generating member 2 and with the centre line 14 of the recording track on the magnetic tape 4.

The track recorded by the test pattern generating member 2 will have a width W (FIG. 2), the magnetic gap 12 (FIG. 1) in the magnetic head 10 having a width S (FIG. 2).

FIG. 1 also schematically illustrates a circuit that may be used for producing the pulse of unidirectional current through the conductive pathway 20 of the test pattern generating member 2. This circuit includes a gas switching tube 34 supplied from a high-voltage supply 36 connected to the cathode of the tube by means of a resistor R1 and a capacitor C1. The anode of tube 34 is connected to the input terminal 30 of the test pattern generating member 2 via a resistor R2 to prevent resonance, the inherent inductance of the sinuous pathway 20 on member 2 being indicated as L1; and the output terminal 31 of the test pattern generating member 2 is connected to ground. A trigger pulse generator 33 is connected to the control electrode of switching tube 34 and triggers same to produce the pulse of unidirectional current. The circuit also includes conventional control and safety interlocks, this being schematically shown by box 40 connected to the high voltage supply 36 and to the trigger pulse generator 38. For added safety, the test pattern generating member is preferably enclosed within a protective screen (not shown), and a safety switch SW is provided which is closed upon removal of the protective screen to by-pass the high unidirectional current to ground.

As one example, the high voltage supply 36 may be a 10.25 KV variable voltage supply; switching tube 34 may be type EEV 8503; resistor R1 may be 200 Mohm; capacitor C1 may be 5 nF; inductance L1 may be 2 uH; and resistor R2 may be 13 ohm.

The test pattern is generated by member 2 and recorded on the record medium 4 when the latter is statically positioned over member 2. Once the test pattern is recorded on the magnetic medium 4, relative motion is effected between that medium and the magnetic head 10 to cause the head to generate an electrical signal which is amplified by amplifier 42 and displayed by oscilloscope 44 to provide an indication of any deviation of the magnetic head 10 with respect to the recording track on the record medium 4.

FIG. 4a illustrates the signal waveform appearing on the screen of the oscilloscope 44 under conditions of exact alignment of the record head with respect to the recording track, i.e., zero skew and zero lateral deviation. FIG. 4b illustrates the waveform with zero skew but non-zero lateral deviation; and FIG. 4c illustrates the waveform with zero lateral deviation but non-zero skew.

Thus, with reference to FIG. 4a, it will be seen that the waveform includes two peaks of the same sign each having an amplitude $2_1$, $2_2$, followed by two peaks of the opposite sign. When there is exact alignment as shown in FIG. 4a, the inervals ($t_1$) between the peaks of adjacent pulses are equal to each other, and the interval ($t_2$) between the first pulse of one sign and the first pulse of the opposite sign is twice that of $t_1$; that is, $t_2=2t_1$. This indicates zero skew, i.e., that the gap 12 of magnetic head 10 is exactly at 90° with respect to centre line 16 of the recorded test pattern and centre line 14 of the recording track. In addition, the amplitude of the first-pulse peaks ($a_1$) is equal to that of the second-pulse peaks ($a_2$); this indicates zero lateral deviation of the centre point 12' (FIG. 1) of magnetic head 10 with respect to the centre line 16 of the recorded test pattern, and therefore with respect to the centre line 14 of the recorded track on the record member 4.

Now, if the magnetic head 10 is not exactly centred with respect to the centre line of the recording track (i.e., centre point 12' of gap 12 is on one side or the other of centre line 14), the peaks $a_1$ and $a_2$ of the signal generated by head 10 will be of unequal amplitude. This is shown in FIG. 4b, wherein it will be seen that amplitude $a_1$ is much larger than amplitude $a_2$, thereby indicating that centre point 12' of the magnetic head is not exactly centred with centre line 14. In FIG. 4b, $t_2$ equals $2t_1$ which indicates zero-skew.

The waveform illustrated in FIG. 4c illustrates the signal generated by magnetic head 10 when there is non-zero skew, i.e., when gap 12 of the magnetic head is not exactly 90° with respect to the centre line 14 of the recording track on the record medium 4. Non-zero skew is indicated in the waveform of FIG. 4c by the fact that $t_2$ is greater than $2t_1$. In FIG. 4c, $a_1-a_2$ which indicates no lateral deviation.

Thus, the operator can easily determine exact alignment of the head 10 by merely viewing the screen on oscilloscope 44 as the magnetic tape 4 is fed past the magnetic head, and can make whatever adjustments are required to cause the magnetic head to be exactly aligned with the recording track on the record medium 4. The above-described arrangement thus displays to the operator not only the magnitude of the track position error, but also the sign of the track position error, thereby enabling him to correct this error by making suitable adjustments in the position of the magnetic head. A number of arrangements are known for making these adjustments.

It will be appreciated that many variations, modifications and other applications of the illustrated embodiment of the invention can be made.

What I claim as my invention and desire to secure by Letters Patent of the United States is:

1. In a system for detecting lateral offset and skew misalignment of a gap-type magnetic head with respect to the center line of a recording track on a record medium, a test pattern generating member for writing a distinctive magnetic image on the record medium, said test pattern generating member comprising:
    A. continuous sinusoidal conductor means, having an elongated rectangular shape, having a plurality of adjacent first and second transverse sinusoid segments, having a longitudinally-extending center line, and having longitudinal edges,
        1. said sinusoidal conductor means for carrying a flux-inducing electrical current pulse through the length of the sinusoidal array, and
        2. said sinusoidal conductor means for producing flux reversals between said adjacent sinusoid segments so that the recorded image contains periodically-occurring flux reversals;
    B. discontinuous nonconductive compressed gap means, formed periodically within said sinusoidal conductor means,
        1. said compressed gap means for narrowly separating said adjacent sinusoid segments, so as to produce a high-density flux concentration between said segments when an electrical current pulse is passed through said sinusoidal conductor means, so that as a magnetic head reads the resulting recorded image on a record medium, a single, sharply-defined pulse is generated each time the head moves across from the flux pattern produced by one sinusoid segment to the pattern produced by the next adjacent segment,
        2. said compressed gap means having first and second center-straddling portions on opposite sides of said conductor means centerline, said first portions extending to said longitudinal edges of said sinusoidal conductor means and said second portions terminating short of said longitudinal edges;
    C. said discontinuous nonconductive compressed gap means further having gap angle means connecting said first and second portions and traversing said conductor means centerline,
        said gap angle means for mutually and longitudinally displacing said center-straddling first and second gap portions,
        so that the sharply-defined unitary pulses, produced when a magnetic head reads the recorded images generated by said displaced first and second gap portions, are distinguishably separated in a manner which enables a comparison to be made of both the amplitudes of adjacent common-polarity pulses as well as the periods between adjacent opposite-polarity pulse groups, so as to indicate lateral offset and skew misalignment of the magnetic head with respect to the recorded image centerline corresponding to the centerline of said sinusoidal conductor means; and
    D. nonconductive substrate means, for supporting said sinusoidal conductor means.

* * * * *